(12) United States Patent
Pacanovsky et al.

(10) Patent No.: US 11,806,979 B2
(45) Date of Patent: *Nov. 7, 2023

(54) POLYMER COMPOSITE BUILDING PRODUCT AND METHOD OF FABRICATION

(71) Applicant: PLY GEM INDUSTRIES, INC., Cary, NC (US)

(72) Inventors: John Pacanovsky, Cary, NC (US); Ibrahim Ali Ozkan, Carrboro, NC (US); Silvester Pius Motha, Morrisville, NC (US); Zhi-Jie Liu, Raleigh, NC (US); Christopher David Strom, Cary, NC (US)

(73) Assignee: Ply Gem Industries, Inc., Cary, NC (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/133,721

(22) Filed: Dec. 24, 2020

(65) Prior Publication Data

US 2021/0129484 A1    May 6, 2021

Related U.S. Application Data

(63) Continuation-in-part of application No. 17/079,897, filed on Oct. 26, 2020.

(Continued)

(51) Int. Cl.
*B32B 5/26* (2006.01)
*B32B 5/08* (2006.01)
(Continued)

(52) U.S. Cl.
CPC ............... *B32B 5/26* (2013.01); *B32B 5/08* (2013.01); *B32B 7/06* (2013.01); *B32B 27/12* (2013.01);
(Continued)

(58) Field of Classification Search
CPC .... B32B 5/26; B32B 5/08; B32B 7/06; B32B 27/12; B32B 27/26; B32B 37/0053;
(Continued)

(56) References Cited

U.S. PATENT DOCUMENTS

| 3,957,413 A | 5/1976 | Lieberman |
| 4,121,008 A | 10/1978 | Seddon |

(Continued)

FOREIGN PATENT DOCUMENTS

| DE | 2215618 | 10/1973 |
| WO | 2016028359 | 2/2016 |

(Continued)

OTHER PUBLICATIONS

U.S. Appl. No. 17/079,897, Non-Final Office Action dated Nov. 24, 2021, 23 pages.

(Continued)

*Primary Examiner* — Maria V Ewald
*Assistant Examiner* — Ethan Weydemeyer
(74) *Attorney, Agent, or Firm* — Lathrop GPM LLP; Robert J. Lambrechts

(57) ABSTRACT

A building product for application to the exterior of a building. The front face of the product utilizes a first fiber sheet partially embedded within a thermoset polymer coating resin. A foamed closed cell admixture composition core with an inorganic filler overlays the thermoset polymer coating resin with the embedded fiber sheet. The admixture composition infiltrates and bonds to the portion of the fiber sheet that is not embedded within the thermoset polymer coating resin mechanically bonding to the thermoset polymer coating. A second fiber sheet overlays the admixture core and the admixture and second fiber sheet form the rear surface of the building product that is mounted adjacent the building surface.

40 Claims, 8 Drawing Sheets

Related U.S. Application Data

(60) Provisional application No. 62/931,479, filed on Nov. 6, 2019.

(51) Int. Cl.
  *B32B 27/12* (2006.01)
  *B32B 27/26* (2006.01)
  *B32B 7/06* (2019.01)
  *B32B 37/00* (2006.01)
  *B32B 37/02* (2006.01)

(52) U.S. Cl.
  CPC .......... *B32B 27/26* (2013.01); *B32B 37/0053* (2013.01); *B32B 37/02* (2013.01); *B32B 2255/02* (2013.01); *B32B 2255/26* (2013.01); *B32B 2262/101* (2013.01); *B32B 2305/28* (2013.01); *B32B 2305/30* (2013.01); *B32B 2305/38* (2013.01); *B32B 2305/72* (2013.01); *B32B 2305/74* (2013.01); *B32B 2307/102* (2013.01); *B32B 2307/304* (2013.01); *B32B 2307/514* (2013.01); *B32B 2307/732* (2013.01); *B32B 2315/085* (2013.01); *B32B 2419/00* (2013.01)

(58) Field of Classification Search
  CPC . B32B 37/02; B32B 2255/02; B32B 2255/26; B32B 2262/101; B32B 2305/28; B32B 2305/30; B32B 2305/38; B32B 2305/72; B32B 2305/74; B32B 2307/102; B32B 2307/304; B32B 2307/514; B32B 2307/732; B32B 2315/085; B32B 2419/00
  See application file for complete search history.

(56) References Cited

U.S. PATENT DOCUMENTS

| | | | |
|---|---|---|---|
| 4,175,155 | A | 11/1979 | Biranowski |
| 4,290,248 | A | 9/1981 | Kemerer |
| 4,366,204 | A | 12/1982 | Briggs |
| 4,573,404 | A | 3/1986 | Held |
| 5,091,436 | A | 2/1992 | Frisch |
| 5,213,819 | A | 5/1993 | Bielfeldt |
| 5,313,999 | A | 5/1994 | Hunter |
| 5,579,687 | A | 12/1996 | Bielfeldt |
| 5,612,125 | A | 3/1997 | Kobayashi |
| 6,007,320 | A | 12/1999 | Froese |
| 7,993,552 | B2 | 8/2011 | Brown |
| 8,806,825 | B2 | 8/2014 | Egan |
| 8,955,281 | B2 | 2/2015 | Pietruczynik |
| 9,573,310 | B1 | 2/2017 | Archuletta |
| 10,005,877 | B2 | 6/2018 | Harasin |
| 2002/0178672 | A1 | 12/2002 | Robinson |
| 2008/0274319 | A1 | 11/2008 | Ebise |
| 2011/0272858 | A1 | 11/2011 | Tamir |
| 2012/0077010 | A1 | 3/2012 | Manesis |
| 2012/0237759 | A1 | 9/2012 | Ehbing |
| 2015/0232631 | A1 | 8/2015 | Balbo |
| 2015/0240492 | A1 | 8/2015 | Teng |
| 2016/0361892 | A1 | 12/2016 | Ciuperca |
| 2016/0368184 | A1 | 12/2016 | Nelson |
| 2017/0114211 | A1 | 4/2017 | Kumar |
| 2020/0011066 | A1 | 1/2020 | Warren |
| 2020/0055275 | A1 | 2/2020 | Yao |

FOREIGN PATENT DOCUMENTS

| | | |
|---|---|---|
| WO | 2020077058 | 4/2020 |
| WO | 2020131990 | 6/2020 |

OTHER PUBLICATIONS

Dieffenbacher, CPS Press System, https://pdf.directindustry.com/pdf/dieffenbacher/cps-press-system/70088-325099.html, dated Aug. 21, 2020.

Hashemi-Nasirabad,Improvement of UF/fiberglassmat properties used in roofing shingles through emulsion polymers and nanoclay addition, Polymer Science Department, Iran Polymer and Petrochemical Institute, Tehran, Iran, dated Jan. 27, 2017.

Chen, Strength evaluations of sinusoidalcore for FRP sandwich bridge deck panels, Department of Civil and Environmental Engineering, West Virginia University, Morgantown, WV, dated Nov. 17, 2009.

Xu, Improving durability of glass fiber reinforced polymer composites by incorporation of ZnO/OMMT nanoparticles subjected to UV radiation and hygrothermal aging, College of Civil Engineering, Nanjing Tech University, Nanjing, Jiangsu, PR China, dated Mar. 2, 2020.

U.S. Appl. No. 17/079,897, Final Office Action dated Jun. 9, 2022, 24 pages.

U.S. Appl. No. 17/079,897, Non-Final Office Action dated Dec. 22, 2022, 6 pages.

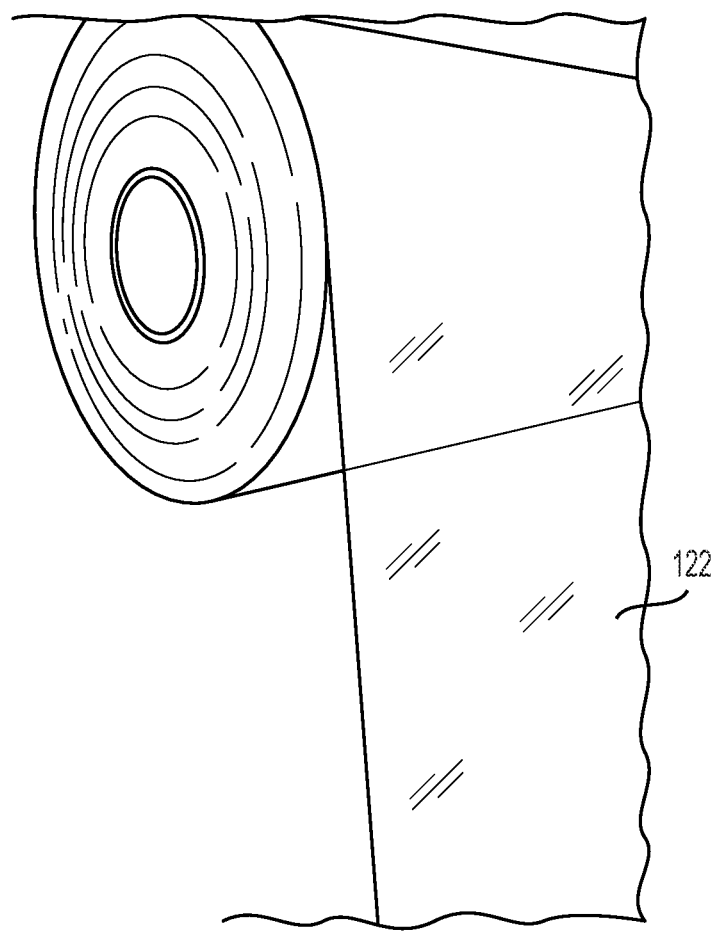
FIG. 6
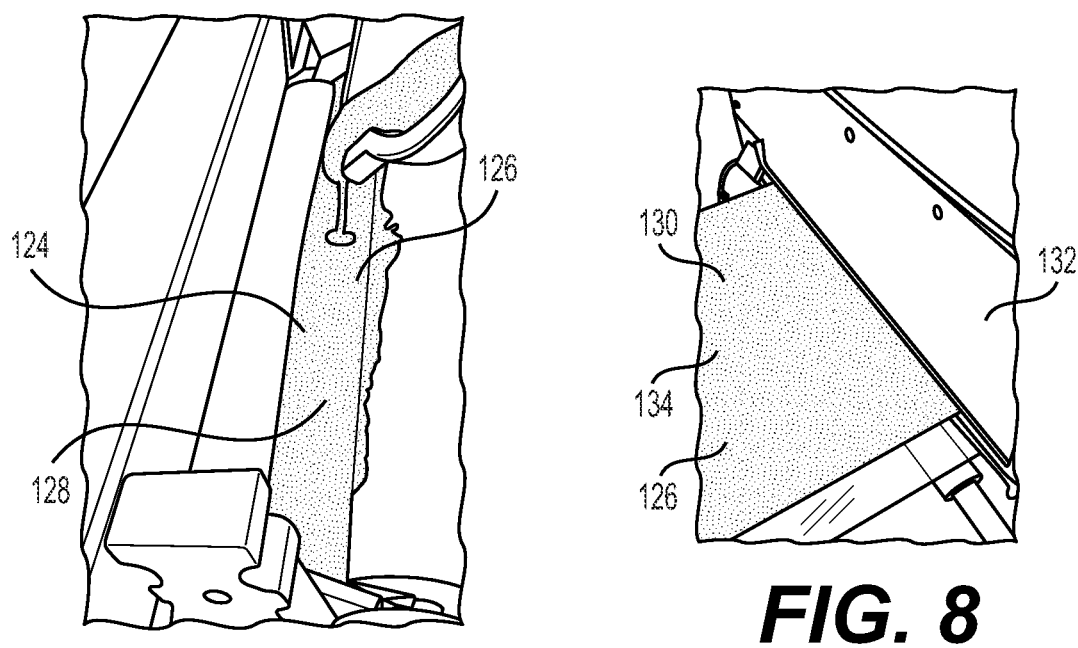
FIG. 7
FIG. 8

POLYMER COMPOSITE BUILDING PRODUCT AND METHOD OF FABRICATION

RELATED APPLICATION

This application claims priority from U.S. application Ser. No. 17/079,897 filed on Oct. 26, 2020 and U.S. Provisional Application No. 62/931,479 filed on Nov. 6, 2019.

TECHNICAL FIELD

This disclosure is directed to polymeric composite building products such as siding elements. The building products having significantly improved flexural properties due to employing polymer impregnated fiber sheets for reinforcement.

BACKGROUND

Consumers are increasingly demanding that exterior building components such as lap siding, roof shakes, siding shakes, bricks, paving stones, stucco sheeting and lap siding provide a high-quality appearance and yet are also extremely durable. These components are built to exacting specifications and constructed of materials that can withstand the bleaching effects of high intensity sunlight, daytime surface temperatures of more than 150° F., constant exposure to high humidity environments and repeated exposure to strong winds, hail impact, sub-zero temperatures and the typical insults building materials are exposed to throughout the United States including impacts from errant baseballs, hockey pucks, soccer balls, abrasive tree limbs and the like. In other words, the typical building component must now be nearly indestructible to maintain customer loyalty.

The building products must be hard, yet ductile and not brittle, to withstand high energy impacts and impacts from tools, such as hammers, during installation. The building materials must have high tensile and compressive strengths to avoid undesirable deformation under loads or fracture when nails or screws are driven through the product. In addition, the building components must have low thermal expansion to avoid buckling when temperatures vary during a short time period such as at sunset in desert settings. The building components must be capable of retarding fires, have low moisture absorption and preferably increases R-value to provide insulating qualities thereby lowering energy costs for the consumer.

Making these building components capable of withstanding high energy impacts, temperature extremes and wind loading is a challenging task that requires considerable expertise with material properties. Further complicating the task of fabricating these building components is the challenge of producing components that are lightweight so that the individual installing the building product (e.g., siding) is not injured through over-exertion.

Building products during their lifetimes are subjected to a variety of impact loads (e.g., hail damage, or damage from objects hurled at the buildings due to tornados or hurricanes). Not all building products are sufficiently tough to withstand such impact loads. Where it is necessary to demonstrate load resistance, it is measured to determine the impact the panel can resist without failure. Flexural toughness is measured as the total area under the load versus deflection curve for a flexural specimen loaded in four-point bending according to ASTM D7249 *Standard Test Method for Facing Properties of Sandwich Constructions by Long Beam Flexure*.

Wood-based panels, for example, can achieve significant flexural toughness and usually are plywood or oriented strand board (OSB), which consist of pieces of wood that are glued together. These panels can provide flexural toughness, but each is combustible and neither is durable when exposed to water. A panel made of the glass fiber sheet reinforced polymer will resist water, and is lighter than wood panels and has robust flexural toughness. It is believed that there is no panel currently available which can provide the flexural toughness of the product as disclosed herein, while avoiding the deficiencies of plywood or OSB panels.

Furthermore, the need for glass fiber sheet reinforced polymer panels configured to behave in the construction environment like plywood and OSB, means the panels are nailable and can be cut or worked using saws and other conventional carpentry tools. It is also desirable for the glass fiber sheet reinforced polymeric products to have low density to facilitate ease of manual handling.

The product should be capable of being cut with the circular saws used to cut wood.

The product should be capable of being fastened to framing with nails or screws while not splintering when secured to the building surface.

The product should be dimensionally stable when exposed to water, i.e., and should expand as little as possible, preferably less than 2% as measured by ASTM D570 *Standard Test Methods for Water Absorption of Plastics*.

The product should not be biodegradable or subject to attack by insects or rot.

It should be evident that the currently available vinyl products meet some, but not all, of the above performance characteristics. There is a need for improved glass fiber sheet reinforced polymer building products that are lightweight with increased flexural toughness and which exceed the capability of the currently-used polymer-based and even cement-based building products by providing non-combustibility and water durability. The fiber sheet reinforced polymer building product as disclosed herein utilizes fiber sheets that may optionally be fabricated from woven or non-woven fabric.

SUMMARY

Key features of the polymer composite building products disclosed herein is that the products are lightweight, have high flexural strength and modulus as well as robust resistance to water absorption. The density of the fiber sheet reinforced products is less than 0.88 g/cm$^3$ (55 lbs/ft$^3$), and preferably less than 0.80 g/cm$^3$ (50 lbs/ft$^3$) or about fifty percent less weight than many competing building products. The disclosed methodology employs selected fiber sheets layered with a lightweight cured polymer admixture to achieve a building product having highly advantageous properties.

The building product fabrication method disclosed herein is directed to the use of a fiber sheet reinforced polymer composition for producing extremely tough, lightweight polymer-based building components. This composition is an admixture of a polyol, isocyanate and an inorganic filler. The polyol may be comprised of as much as 100% diethylene glycol. The fiber sheet disposed on the outward facing surface of the building product is enveloped by a thermoset coating composition. A second fiber sheet is also employed on the inward facing surface of the building product and it may optionally be enveloped in thermoset coating composition coating.

It has been found that the material combination disclosed herein lends itself to a lightweight fiber sheet reinforced polymer that possesses significant toughness (energy absorption capability). The fiber sheet reinforced polymer composition attains a toughness that is greater than that for non-fiber sheet reinforced polymer building products. The fiber sheet, commonly referred to as a mat or mesh, is selected to have properties that lead to enhanced building product performance. Glass reinforced polymer products using the formulation disclosed herein can be targeted for a variety of applications in building constructions.

Because of the closed cell configuration of the disclosed admixture formulation, the front and rear fiber sheets and the polymer composition, the building product disclosed herein is particularly useful in applications where damage due to water absorption is of great concern. An example of a potential application for the disclosed product is exterior siding for buildings. Typical compositions for disclosed embodiments achieve a combination of low water absorption, improved flexural strength, and less splintering during attachment to the building structure using nails or threaded fasteners.

The preferred fiber sheet can be used alone or in combination with other types of fibers such as carbon fibers, steel fibers or other polymer fibers.

It is an object of the method disclosed herein to produce a building product that has a low specific gravity that minimizes the muscle fatigue of the installer of the building product while not sacrificing other desirable performance characteristics.

It is an object of the product and method disclosed herein to produce a building product that has a low coefficient of thermal expansion.

It is an object of the product and method disclosed herein to produce a polymer coated fiber sheet building product that has a Class A fire resistance rating as determined by testing pursuant to the standard ASTM E84—*Standard Test Method for Surface Burning Characteristics of Building Materials.*

It is an object of the product and method disclosed herein to produce a building product that has resistance to damage from winds at hurricane force levels.

It is an object of the product and method disclosed herein to produce a building product that is resistant to termites.

It is an object of the product and method disclosed herein to produce a building product wherein the increase in weight of the building product due to water absorption is less than 2% as determined by ASTM D570 *Standard Test Method for Water Absorption of Plastics.*

Various objects, features, aspects and advantages of the disclosed subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims.

BRIEF DESCRIPTION OF THE DRAWINGS

FIG. 6 illustrates a roll of the first polymeric release film;

FIG. 7 illustrates an embodiment of a reservoir containing a thermoset polymer coating resin that empties into a collection area;

FIG. 8 illustrates the evenly distributed thermoset polymer coating resin sheet advancing into a curing oven;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

Figure 1:
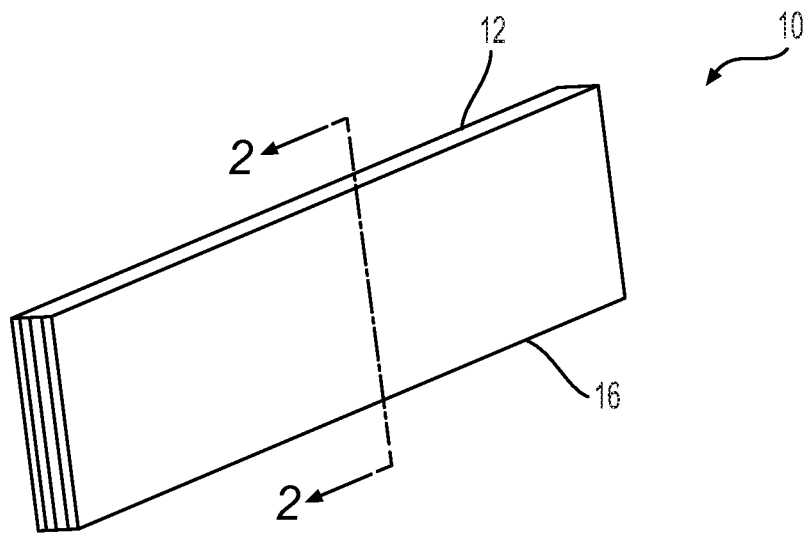
FIG. 1 illustrates an embodiment of the building product in the form of a section of a siding panel.
Figure 2:
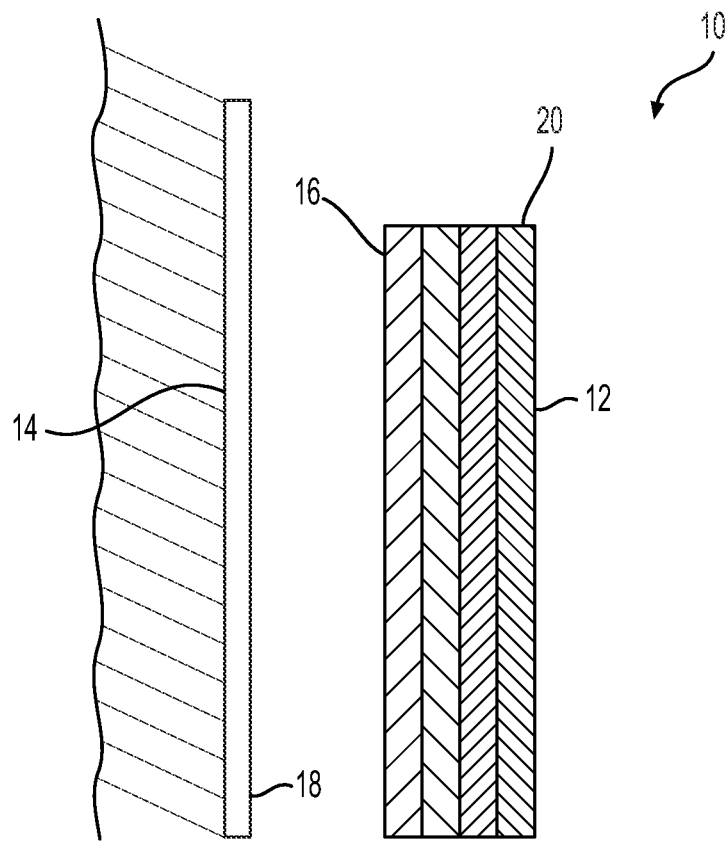
FIG. 2 illustrates a cross-sectional view along line 2-2 in FIG. 1 of the embodiment of the building product, with a wall element not found in FIG. 1 included.

As shown in FIGS. 1 and 2, the layered building product 10 disclosed herein is engineered to provide a highly durable product that among other desirable attributes is lightweight, resists splintering and deformation during the installation process and resists water absorption once applied to the structure.

Figure 3:
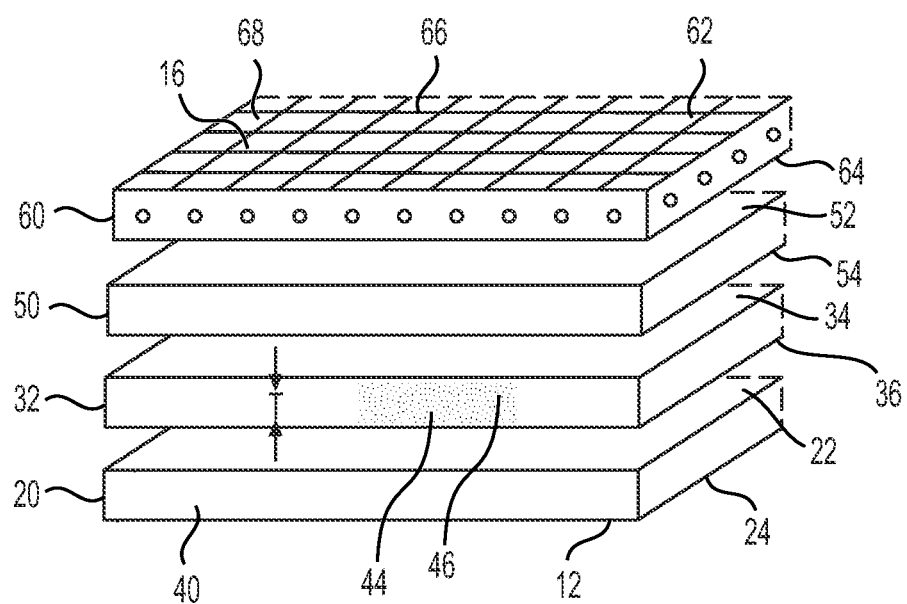
FIG. 3 illustrates an exploded view of an embodiment of the multi-layered building product.

As illustrated in FIGS. 2 and 3, the building product 10 includes a front face 12 for facing outward from the building 14 and a rear face 16 for placement adjacent to a building surface 18 of the building. The first layer 20 is a longitudinally extending highly filled thermoset polymer coating resin layer with a top surface 22 and a bottom surface 24. It is well known in the industry that the term highly filled means a resin that includes greater than 30% filler. Disclosed herein is a thermoset polymer coating resin composition that is preferably in the range of 40% to 85% a thermoset filler. The preferred thermoset filler is calcium carbonate; however, other materials such as talc, mica, barium sulfate, titanium dioxide, phyllosilicates clay such as montmorillonite clay and milled or chopped fiberglass are also contemplated by this disclosure.

The thermoset coating composition layer 20 is comprised of at least one of epoxy, urethane, acrylate, vinyl ester, polyester, cyanate ester, benzocyclobutene, and bismaleimide and includes at least one curing agent. The curing agent is preferably at least one of an anhydride, an amine or a polyamide. The thermoset polymer coating resin can also contain the UV absorber, hindered amine light stabilizer (HALS), antioxidants and colorants. This enables the coating to be applied in the desired color of the product and other commonly used additives to enhance performance.

The thickness of the thermoset polymer coating resin layer 20 is carefully maintained during the fabrication of the longitudinally extending resin layer which will be more fully detailed below. However, the building product 10 requires dimensional tolerances that are carefully maintained to include the thickness of the thermoset polymer coating resin layer 20.

The thermoset resin is poured in an uncured liquid form onto a polymeric release sheet that prevents undesirable adherence of the resin to the lower endless belt of the continuous forming apparatus. The width dimension of the polymer coating resin layer 20 is controlled by edge dams on the lower endless belt. A controlled delivery of the liquid thermoset resin onto the advancing lower endless belt yields a thermoset polymer coating resin layer 20 that is uniform in width and thickness. The polymer coating resin layer 20 once deposited onto the plastic release film advances into a curing oven for partial curing, i.e., the resin remains tacky but is still flowable. The polymer coating resin layer 20 has a bottom longitudinally extending surface 24 that remains in contact with the polymeric release film and a top longitudinally extending surface 22.

The next layer to be applied to the building product 10 is a fiber sheet 32 with a top longitudinally extending surface 34 and a bottom longitudinally extending surface 36. The fiber sheet 32 has an areal weight in the range of 50-95 g/m² and a thickness T that is in the range of about 20-30 mils and preferably about 25 mils. The fiber sheet 32 is preferably a fiber mat and may optionally be comprised of cellulose, acrylic, polyester, nylon, aramid, carbon fiber, glass mats and glass mesh. The preferred fiber sheet 32 embodiment is a fiberglass mat comprised of randomly oriented fiberglass mesh as this type of fiber sheet has resulted in the best performance. The fiber sheet 32 may also optionally be comprised of woven, non-woven, continuous or chopped fiber. In addition, the selected fibers preferably contain a silane sizing. The silane sized fibers may also incorporate acrylic, urea-formaldehyde or polyester type binders to form the glass mats and mesh. Exemplary fiber sheets for this application are Evalith® 7503 and 8514 produced by Johns Manville.

The above disclosed areal weight and thickness ranges are preferred because an areal weight in this range provides the finished building product with sufficient rigidity and structural integrity, particularly integrity of the building product during the nailing of the product to the structure during installation. Moreover, the referenced fiber sheet 32 thickness and areal weight minimizes the overall weight of the finished product without sacrificing performance. The reduced product weight also tends to reduce installer fatigue. The fiber sheet 32 thickness T of roughly 25 mils with the referenced areal weight and at the pressure applied by the building product fabrication system facilitates wetting of the mat fibers by the resin to only a portion $T_R$ of the total thickness T of the fiber sheet 32. The bottom surface 36 of the fiber sheet 32 is pressed into the top surface 22 of the partially cured, but still highly pliable, thermoset polymer coating resin layer 20.

Figure 4:
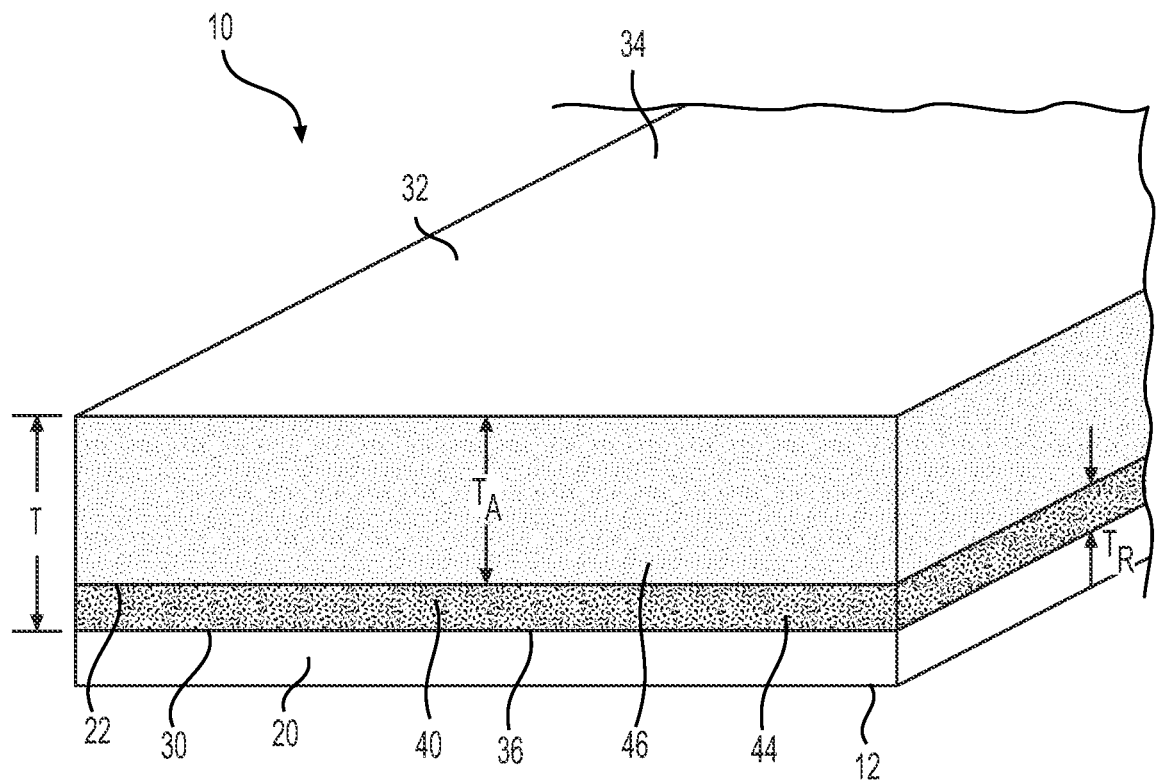
FIG. 4 illustrates a cross-sectional view of an embodiment of the interface of the first fiber sheet disposed atop the thermoplastic polymer layer.

As seen in FIG. 4, the pressing of the bottom surface 36 of the fiber sheet 32 into the top surface 22 of the thermoset polymer coating resin layer 20 causing a top portion 40 of the thermoset coating composition layer 20, also known as the partially cured resinous material 40 to migrate through to the lowermost fibers 44 of the fiber sheet 32, thereby forming a region in the lowermost fibers 44 of the fiber sheet 32 rich in the migrated thermoset coating 40. The migrated top portion 40 of the thermoset coating composition 20 is intimately contacting the fibers in the lowermost portion of fiber sheet 32. This migration does not result in the remainder of the fibers of the entire thickness T of the fiber sheet 32 being enveloped by the resinous material 40 but only a portion (designated as $T_R$), or percentage, of the overall thickness leaving a portion $T_A$ of the fiber sheet 32 un-enveloped by the resin 40.

Roughly 2-3 mils of the fibers in the fiber sheet 32, designated as $T_R$ in FIG. 4, are enveloped by the resinous material 40 or about 10% of the total thickness T of the fiber sheet 32. In an exemplary embodiment, the resin layer 20 has a thickness in the range of 5-8 mils and approximately 2-3 mils of the partially cured resin layer 20 infiltrate the fiber sheet 32 as seen in FIG. 4. Between 2-6 mils of the resin layer 20 does not infiltrate the fiber sheet 32 and that 2-6 mil thick layer of un-infiltrated resin comprising the thermoset layer 20 serves as the front face 12 of the building product 10.

Because the front face 12 of the building product 10 will typically be seen by the public, the front face 12 may be painted or coated for decorative purposes. The molecular force of attraction between unlike materials determines their adhesion. The strength of attraction depends on the surface energy of the substrate. High surface energy means a strong molecular attraction, while low surface energy means weaker attractive forces. The front face surface 12 of the thermoset polymer coating resin layer 20 as disclosed herein has an amorphous structure, meaning the molecules at the surface tend to be loosely packed making them easier to adhere to than substrates that are more tightly packed. The measured surface energy of the front face 12 of the thermoset polymer coating resin 20 is at least 38 dynes/cm and is generally in the range of 42-46 dynes/cm resulting in good surface adhesion characteristics.

As seen in FIG. 3, the next layer of the building product 10 is a highly filled closed cell admixture core 50 that is laid atop the top surface 34 of the fiber sheet 32. As previously discussed and as seen in FIG. 4, the pressing of the bottom surface 36 of the fiber sheet 32 into the top surface 22 of the thermoset polymer coating resin causes the pliable partially cured resin 40 to migrate through and infiltrate the lowermost fibers 44 of the fiber sheet 32 that are proximate the bottom surface 36. This infiltration results in only the lower portion $T_R$ of the fiber sheet 32 being enveloped by the resin. As previously detailed, this percentage of the thickness ($T_R$) is preferably about 10 percent of the overall thickness T. The remainder of the fibers 46 in the fiber sheet 32 are not infiltrated by the partially cured resin 40 from the first layer 20 and this portion of the thickness of the fiber sheet 32 is designated as $T_A$ in FIG. 4

The admixture core 50, as illustrated in FIG. 3, includes a longitudinally extending upper surface 52 and an opposed longitudinally extending lower surface 54. The admixture core 50, a highly filled polyurethane rigid foam, is comprised of a diisocyanate, an inorganic admixture filler and a chain extender. A traditional urethane is comprised of polyols, diisocyanates and chain extenders. Typical polyols utilized in urethane compositions are polyester polyols and polyether polyols. In the disclosed composition, the chain extender serves as a polyol substitute in the admixture. Diethylene glycol (commonly referred to as DEG) is an exemplary chain extender; however, DEG is not the only chain extender contemplated by this disclosure. The DEG component preferably comprises in the range of about 5 to 20 percent, by weight, of the admixture. The diisocyanate is comprised of at least one of methylenebis diisocyanate, toluene diisocyanate, hexamethylene diisocyanate, naphthalene diisocyanate, methylene bis-cyclohexylisocyanate, isophorone diisocyanate, toluene diisocyanate, m-Phenylene-diisocyanate and xylene diisocyanate. The diisocyanate comprises in the range of 5 to 20 percent by weight of the admixture and the inorganic filler comprises in the range of about 50 to 85 percent by weight of the admixture. As previously discussed, an admixture core comprising up to 85% by weight of an inorganic filler yields a layered building product that resists brittleness and exhibits robust impact resistance as well as structural rigidity.

While numerous admixture inorganic fillers are contemplated by this disclosure, the preferred inorganic filler is sand. Preferably about 50 percent of the filler particle distribution comprises a diameter of less than 249 microns. If the aggregated filler diameter is too large, the resulting surface area of the filler is insufficient for the polyurethane formulation to totally wet out the filler. In other words, larger mean diameter filler has less surface area compared to the same volume of smaller mean diameter filler. Therefore, the available quantity of pre-reacted polyurethane monomers and oligomers will occupy large distances between the larger diameter filler particles. The typical filler particle diameter is in the range of 74 to 600 microns.

Having a large span of cured polyurethane monomers and oligomers between filler particles will dramatically reduce physical properties as resin is inherently weaker than the particles. One of the important features of adding filler to polymer compositions (e.g., the polyurethane resin) in general is to transfer stresses from the resin (weak) to the filler (strong). The larger the distance between filler particles the greater the chance of failure during the transfer. Filler particle size is critical and the disclosed filler diameter and loading is used to optimize the mechanical parameters that are so highly desired in lightweight building products.

The polyurethane resin component of the admixture core 50 as disclosed herein has a free rise density in the range of about 6.5 to 7.5 pounds per cubic foot. It is well understood by those skilled in polymer compositions that an admixture generated foam with a free rise density of greater than 4 pounds per cubic foot is viewed as a closed cell foam. Closed cell foam is less permeable to water, vapor, and air than open cell foam. Closed cell foam is less likely to be structurally impacted by the effects associated with water damage, i.e., mold, mildew, rot, and bacteria. The free flow of water can be detrimental to a building product by trapping the water. As will be discussed in greater detail below, the building product 10, as disclosed herein, has a very low water absorption rate.

As further illustrated in FIG. 3, the longitudinally extending lower surface 54 of the admixture core 50 is positioned atop the top surface 34 of the fiber sheet 32. Under pressure, the lower longitudinally extending surface 54 of the admixture core 50 fluidly infiltrates the remaining thickness of the fiber sheet 32 that is unoccupied by the thermoset polymer coating resin 40. The admixture infiltrated thickness of the fiber sheet 32 is designated as $T_A$ in FIG. 5. The admixture composition envelopes and binds to the fibers 46 of the fiber sheet 32 in the region designated by $T_A$ in FIGS. 4 and 5.

The admixture composition also infiltrates into and interfaces with the top surface 22 of the resin layer 20. The top surface 22 of the polymer coating resin composition and the lower surface 54 of the admixture core 50 also chemically and mechanically bond with one another thereby further increasing the bond strength between the various layers of the building product 10. Thickness $T_A$ is at least 60% or at least 15 mils of an exemplary 25 mil thick fiber sheet 32. As previously detailed, the total thickness of fiber sheet 32 is designated as T while that portion of the fibers 44 of fiber sheet 32 enveloped with resin 40 is $T_R$ and that portion of the fibers 46 of fiber sheet 32 that is enveloped with the admixture is $T_A$. In summary, $T_A+T_R=T$.

Figure 5:
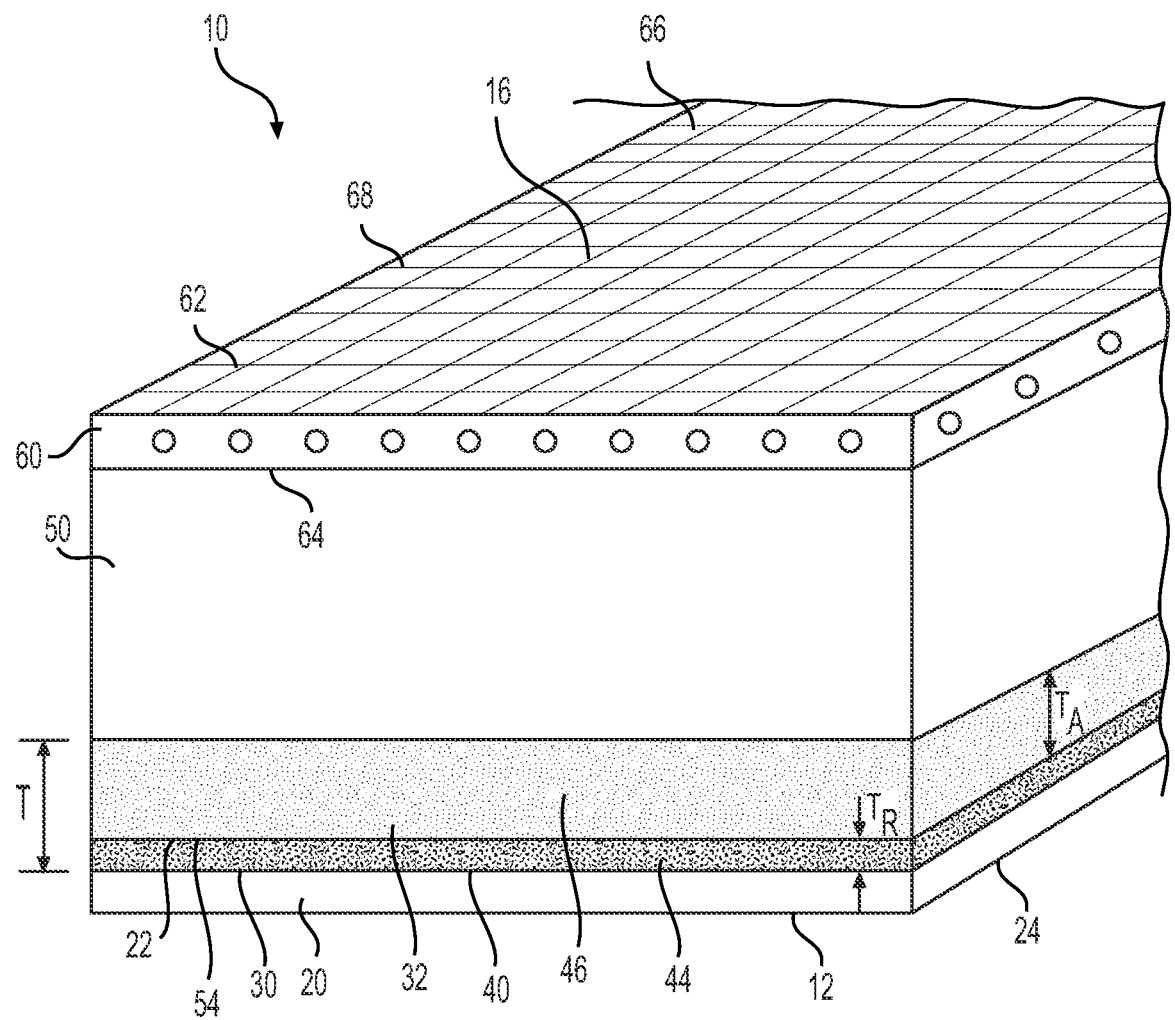
FIG. 5 illustrates a cross-sectional view of an embodiment of the interface of the admixture core disposed atop the first fiber sheet and the interface of the first fiber sheet with the thermoplastic polymer layer.

As seen in FIGS. 3 and 5, the final layer of the building product 10 is a second longitudinally extending fiber sheet 60 with a top surface 62 and a bottom surface 64. The second fiber sheet 60 is preferably a fiberglass mesh with an eye size 66 of at least 2 mm by 2 mm. Fiber mesh with an eye size of about 4 mm by 4 mm is preferred because test data has revealed this eye size optimizes the desired performance characteristics of the building product layers as disclosed herein. An eye size 66 of roughly 4 mm by 4 mm provides excellent strength enhancement to the building product 10 and provides a desirable level of engagement with the resinous content of the admixture core. Robust inter-engagement between the second fiber sheet 60 and the admixture core 50 reduces the prospect of splintering of the building product 10 when nails or threaded fasteners pass through the product 10 and into the surface 18 of the building 14.

The second fiber sheet 60 may optionally be fully coated, or partially coated, with a thermoset polymer coating resin 68 as is the first fiber sheet 32 of the building product 10. The second fiber sheet 60 preferably has an areal weight in the range of 140-170 g/m². This areal weight for the second fiber sheet 60 provides excellent integrity maintenance for the building product 10 further reducing the likelihood of splintering and cracking of the building product 10 when a nail or threaded fastener is passed through the product and into the building surface 18. An exemplary fiberglass mesh for this application is exterior insulation and finish system (EIFS) mesh manufactured by BOEN™. The admixture core 50 is forced under pressure all the way through to the longitudinally extending top surface 62 of the second fiber sheet 60 and becomes infiltrated throughout the entire thickness of the second fiber sheet 60.

The top surface 62 of the longitudinally extending second fiber sheet 60 is the rear face 16 of the building product 10 and is the surface that faces the surface 18 of the structure to which it is attached. One of the primary benefits of the building product 10 as disclosed herein is the ability of the product to limit an increase in weight of the building product, due to water absorption, to less than about 2 percent as determined by testing consistent with ASTM D570 titled *Standard Test Method for Water Absorption of Plastics*. The closed cell foam of the admixture core 50 along with the near impermeability to water of the thermoset polymer coating resin layer 20 results in a building product 10 that is in the range of 7-10 mm in thickness and that is highly resistant to damage from moisture, mold and insects.

Table 1 below details the increase in building panel flexural strength as well as flexural modulus as the amount of chain extender utilized in the admixture increases relative to the utilization of polyols. An increase in chain extender, and specifically diethylene glycol (DEG), and a commensurate reduction in polyol content, yields a building panel with substantially enhanced flexural strength and modulus. The utilization of a chain extender such as DEG within the admixture core of the building panel as disclosed above has been shown through testing to produce a 32 percent increase in flexural modulus and nearly a 46 percent increase in flexural strength.

TABLE 1

Performance Parameters

| Parameter | Example 1 | Example 2 | Example 3 | Example 4 | Example 5 |
|---|---|---|---|---|---|
| Chain extender percentage DEG/ (DEG + polyol) | 39% | 68% | 79% | 90% | 100% |
| Flexural strength (Mpa) | 13.0 | 12.5 | 13.7 | 16.3 | 19.1 |
| Flexural modulus (Mpa) | 827.7 | 789.7 | 817.6 | 978.0 | 1092 |

With the composition of each of the building product layers now fully disclosed, the method of fabricating the multi-layered product shall be discussed. The method of fabrication as detailed herein is performed in a building product fabrication system that incorporates all the elements as later disclosed in this detailed description. At the beginning of the building product fabrication system, as detailed in FIG. 6, a first polymeric release film 122 is fed into the building product fabrication system. A polymeric release film 122 with a thickness in the range of from about 0.5 to 4 mils is preferred; however, films with a lesser or greater thickness are also contemplated by this disclosure. Release films may be comprised of any coated polyethylene, polypropylene, polyester or paper.

As the first polymeric release film 122 advances into the building product fabrication system the film travels beneath a reservoir 124 retaining a thermoset polymer coating resin 126. Thermosetting resins require the addition of other chemicals to render them processable. For reinforced plastics, the compounds usually comprise a resin system (with curing agents, hardeners, inhibitors, plasticizers) and fillers and/or reinforcement. The resin system provides the "binder," to a large extent dictating the cost, dimensional stability, heat and chemical resistance, and basic flammability.

The reservoir 124 empties into a collection area 128 as best seen in FIG. 7. The collection area 128 serves to distribute the thermoset polymer coating resin 126 across a wide area that roughly comprises the width of the finished building product or multiples of the width of the finished building product in those instances when the product under fabrication can be divided during fabrication. An exemplary building product for fabrication in this system is a siding panel. Siding panels are commonly produced in widths of 7 and 8 inches. Consequently, the building product in this system may be fabricated in widths that are multiples of these panels such as 14 inches, 16 inches, 21 inches and 24 inches and then the desired panel widths are cut from the larger panels while traversing through the system.

The thermoset polymer coating resin solution may be comprised of any of epoxy, urethane, vinyl ester, polyester, cyanate ester, benzocyclobutene, and bismaleimide or combinations thereof. This listing of polymer coating resin solutions is not intended to be limiting as other polymer coating resins are also contemplated by this disclosure. The thermoset polymer coating resin solution is further comprised of a curing agent which is employed to accelerate the curing of the polymeric resin of the thermoset. Curing agents that are anhydride based, amine based or polyamides are among those contemplated by this disclosure. The thermoset polymer coating resin also optionally contains UV absorbers, hindered amine light stabilizer (HALS), antioxidants and colorants. The colorants enable the coating to be applied in the desired color of the product. The thickness of the thermoset coating sheet 20 laid atop the first polymeric release film 122 is in the range of 5-15 mils thick with a preferred thickness in the range of 5-8 mils.

The thermoset polymer coating resin 126, as seen in FIG. 8 and as previously disclosed herein also utilizes a filler that comprises in the range of about 40 to 85 percent of the weight of the thermoset polymer coating resin 126. The filler is preferably calcium carbonate, talc, mica, barium sulfate, titanium dioxide, milled or chopped fiberglass. Fillers and additives can influence mechanical properties, especially for improvement in dimensional stability, flame retardancy and ultraviolet (UV) stability. This listing of fillers should not be considered limiting as additional fillers, can provide superb mechanical properties.

The liquid thermoset polymer coating resin 126 is applied to the release film 122 using conventional coating components such as a roll, a reverse roll, gap, knife over roll or gravure coating all of which are well known in the art. The preferred application for the application of the thermoset resin disclosed herein is the use of gap and roll coating techniques. The next step of the building product fabrication in the building product fabrication system is to advance the first polymeric release film 122 and the thermoset polymer coating resin sheet 130 into an oven 132 for partial curing as seen in FIG. 8.

The continuous layered sheet 134 of the first polymeric release film 122 and thermoset resin sheet 130 are conveyed through the curing oven and are exposed to oven temperatures in the range of about 210° to 230° F. The advancing layered sheet 134 of the first polymeric release film 122 and thermoset polymer coating resin coating 130 are exposed to the oven temperature in the range of only about 2 to 4 minutes to facilitate partial curing of the thermoset resin sheet 130. The thermoset resin sheet 130 is not fully cured in the curing oven at this stage of the building product fabrication to maintain some measure of fluidity of the resin sheet 130.

Figure 9:
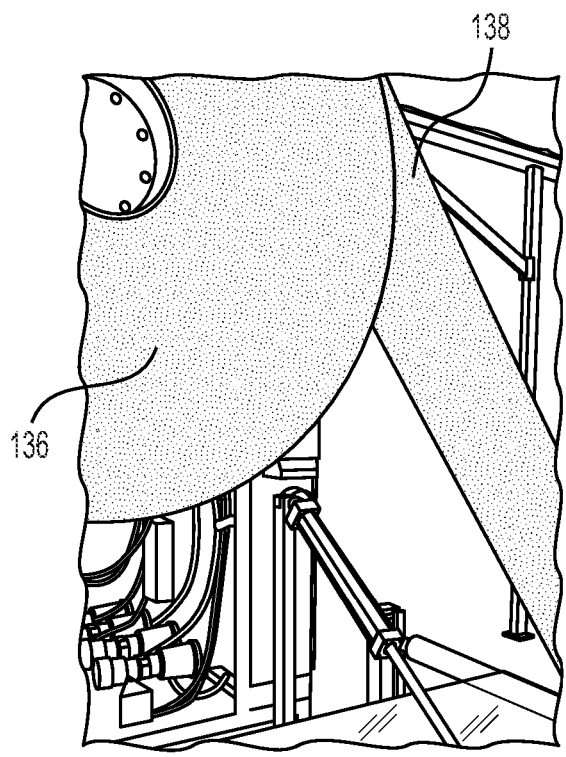
FIG. 9 illustrates a roll of fiber sheet feeding into the advancing siding panel fabrication system.
Figure 10:
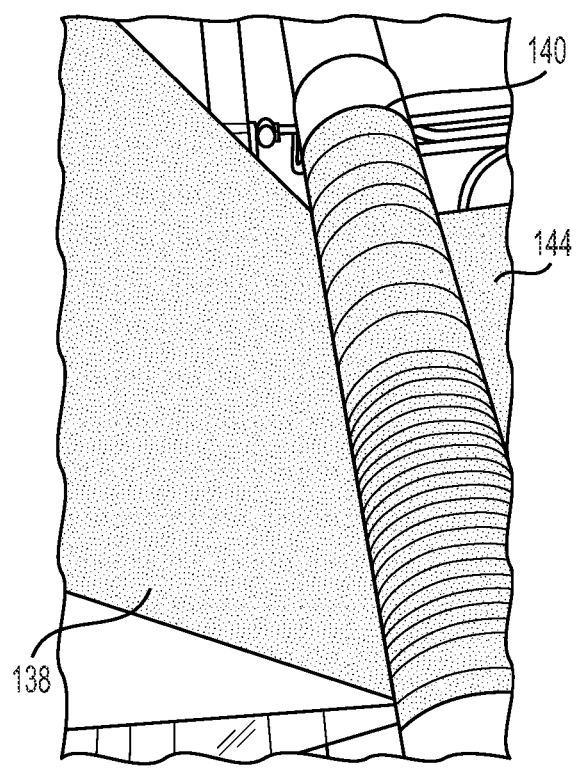
FIG. 10 illustrates a roller pressing the fiber sheet onto the thermoset polymer coating resin sheet.

FIGS. 9-10 depict a large roll 136 of a fiber sheet 138 that is used in the laying of the fiber sheet 138 atop the advancing layered sheet 134. The fiber sheet reinforcement can particularly influence heat and dimensional stability; however, the main effect is on tensile strength and toughness. As shown in FIG. 10 in an exemplary system embodiment, the fiber sheet 138 is fed under a roller bar 140 and applies pressure to the fiber sheet 138 to merge the fiber sheet and the partially cured thermoset coating 130 into an advancing three-layer sheet 144 (to include the polymeric release film 122).

The fiber sheet 138 as disclosed herein, is preferably comprised of at least one of cellulose, acrylic, polyester, nylon, aramid, carbon fiber, glass mats and glass mesh; however, other fiber sheet materials are also contemplated by this disclosure. In addition, the fiber sheet 138 may also be comprised of at least one of a sheet comprised of continuous or chopped fibers. As previously detailed, the partially cured thermoset resin sheet 130 maintains fluidity after passing through the curing oven.

Figure 11:
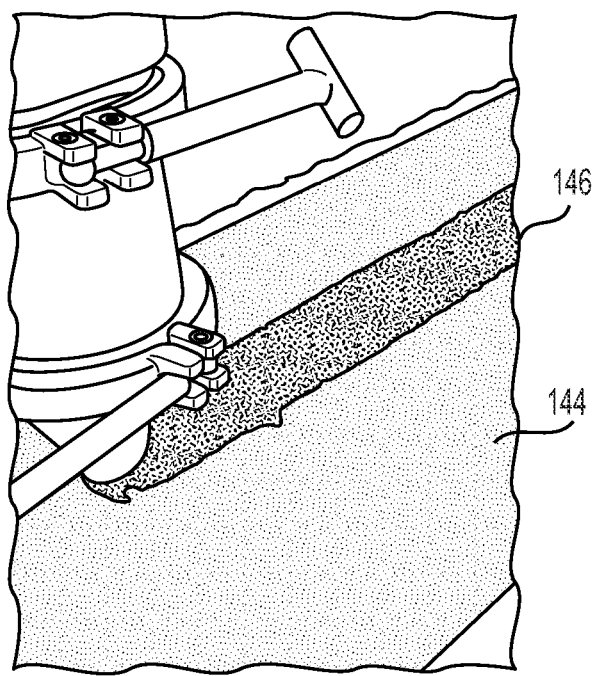
FIG. 11 illustrates a line of admixture being applied atop the advancing fiber sheet.

The fluidity of the partially cured resin sheet 130 allows the resin to infiltrate the fibers of the fiber sheet 138 thereby providing an excellent mechanical interlock. The infiltration occurs as the fiber sheet 138 and the thermoset polymer coating resin sheet 130 pass under the roller bar 140. The resinous material under pressure surrounds and adheres to the fibers. After the fiber sheet 138 is laid atop the thermoset coating sheet 130 an admixture 146 is deposited atop the advancing three layered sheet 144. The admixture 146 is preferably deposited atop the advancing three-layered sheet 144 in a single line as shown in FIG. 11.

The admixture 146 as previously detailed is comprised of a chain extender, such as diethylene glycol, a diisocyanate and a filler. The diisocyanate as disclosed herein comprises in the range of about 5 to 20 percent of the overall weight of the admixture 146. The second ingredient for admixing is the filler which preferably is a fine grain sand, talc or calcium carbonate. The listing of fillers should not be considered limiting as additional, unlisted fillers also contribute to the attainment of exceptional mechanical properties.

The aspect ratio of the filler is directed to the shape of the filler particle and a round particle has a lower aspect ratio than a pancake shape or a rod-shaped particle. The aspect ratio of a particle is defined as the ratio of its major dimension and minor dimension. The greater the aspect ratio, the better the mechanical properties are (i.e., talc has a higher aspect ratio than calcium carbonate and would have better overall mechanical properties as an additive filler). A filler aspect ratio of at least 2.0 is preferred.

The preferred additive filler of fine grain sand has a median particle size range from 37 to 425 microns, preferably between 150-300 microns. For talc, the median particle size range would be 30 to 44 microns and for calcium carbonate the median particle size range is 2.8 to 16 microns and preferably 4-10 microns. The surface of the filler also impacts the adhesive quality of the bond between the resin and the filler. A jagged shaped surface will have better properties than a more smooth and regular shaped particle.

The third and final component of the admixture is the chain extender. While diethylene glycol (DEG) is an exemplary chain extender, other chain extenders not specifically identified herein are also contemplated by this disclosure. The chain extender preferably comprises between about 5 to 20 percent by weight of the admixture. The admixture 146 deposited onto the advancing three-layered sheet 144 has a density ranging from about 43 to 94 pounds per cubic foot. After the admixture 146 is deposited atop the advancing three layered sheet 144, a second fiber sheet 148 and a second polymeric release film 150 are applied over the admixture 146.

Figure 12:
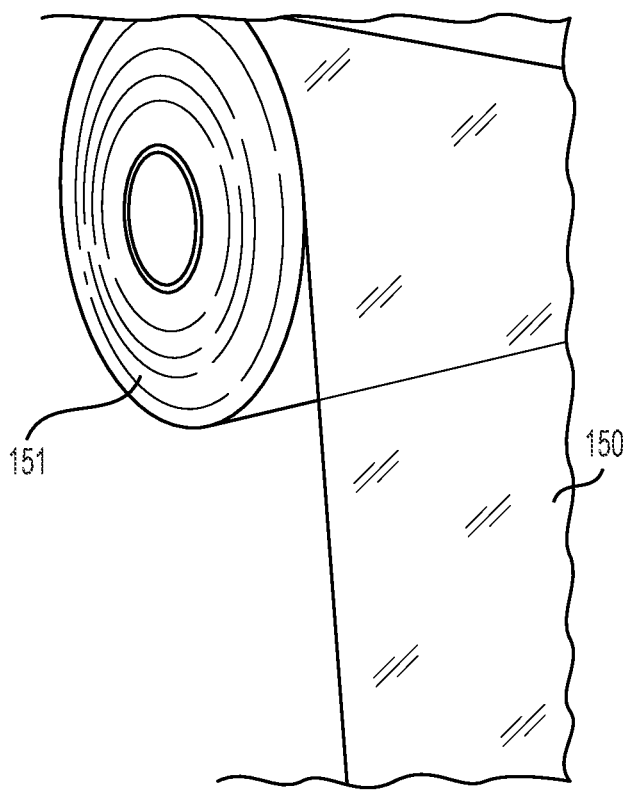
FIG. 12 illustrates the unwinding of a second polymeric release film from a roll.

As the deposited line of admixture 146 disposed atop the three-layered sheet 144 advances, the admixture 146 remains in the straight line "log" configuration even as a second fiber sheet 148 and a second polymeric release film 150 are applied over the now four layered-sheet 152. The second polymeric release film 150 is preferably unwound from a roll 151 as seen in FIG. 12. The second polymeric release film 150, as with the first polymeric release film 122 has a preferred thickness in the range of from about 0.5 to 4 mils; however, films with a lesser or greater thickness are also contemplated by this disclosure.

Once the second fiber sheet 148 and the second polymeric release film 150 are applied to the advancing four-layered sheet 152 the now six-layered panel 156 advances into the circulating mold 160 comprising a plurality of upper and lower mold belts 162, 164. Prior to entry to the mold 160 a mold release compound is optionally sprayed onto the upper and lower belts. An exemplary mold release compound is CRC® 03300 Silicone Mold Release compound. In addition, and as previously detailed, the upper and lower mold plates 162, 164 are protected by the polymeric release films 122, 150.

Figure 13:
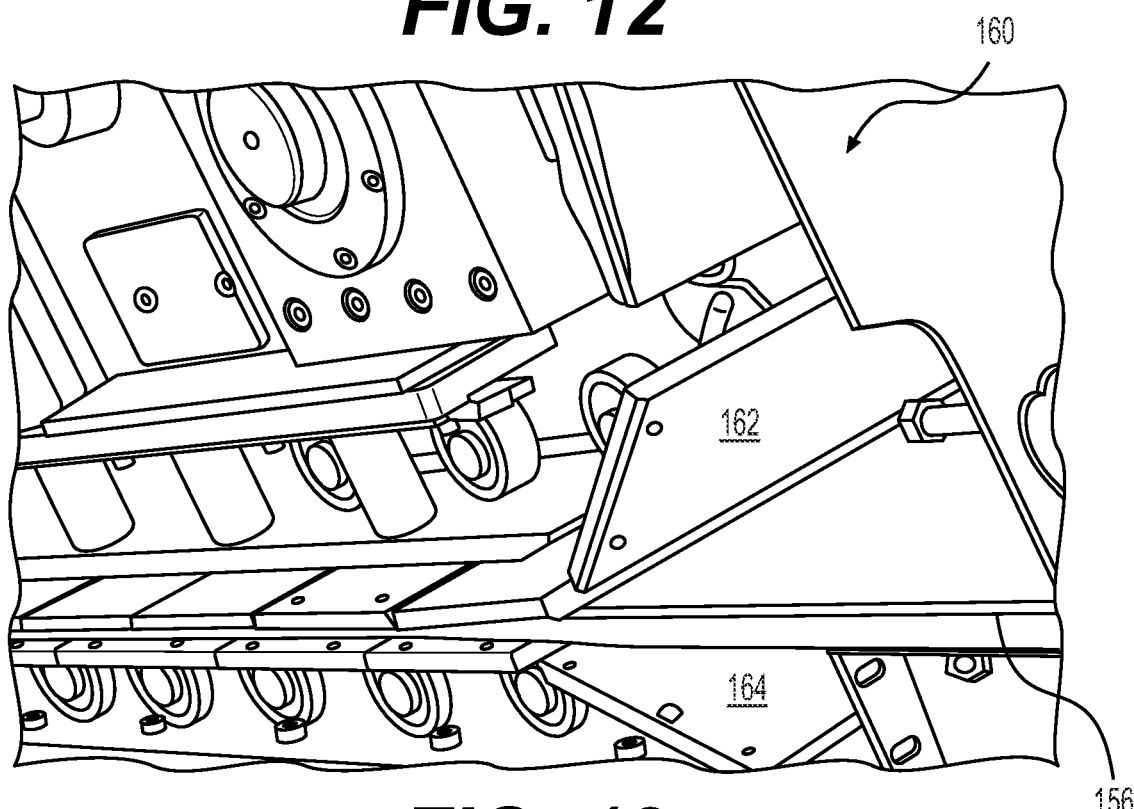
FIG. 13 illustrates the building product traversing through the continuous belt mold.

As seen in FIG. 13, the plurality of upper and lower mold plates 162, 164 continuously circulate at a pace that advances the six-layered panel 156 through the building product fabrication system. The lower mold plates 164 support the six-layered panel 156 as it advances through the continuously circulating mold 160 while the upper mold plates are preferably utilized for embossing the advancing panel 156.

The upper and lower mold plates 162, 164 are heated and serve to cure the uniformly distributed admixture 146. The method as disclosed herein provides that heat is applied to the mold plates 162, 164 to maintain a mold temperature in the range of about 175° to 250° F. for about 3 to 6 minutes. As the six-layered panel 156 exits the mold, the upper and lower mold plates 162, 164 diverge, or retract respectively upwardly and downwardly as best seen in FIG. 10. The mold plates 162, 164 as part of a circulating mold 160, traverse an oblong path and return to the start of the molding process.

Figure 14:
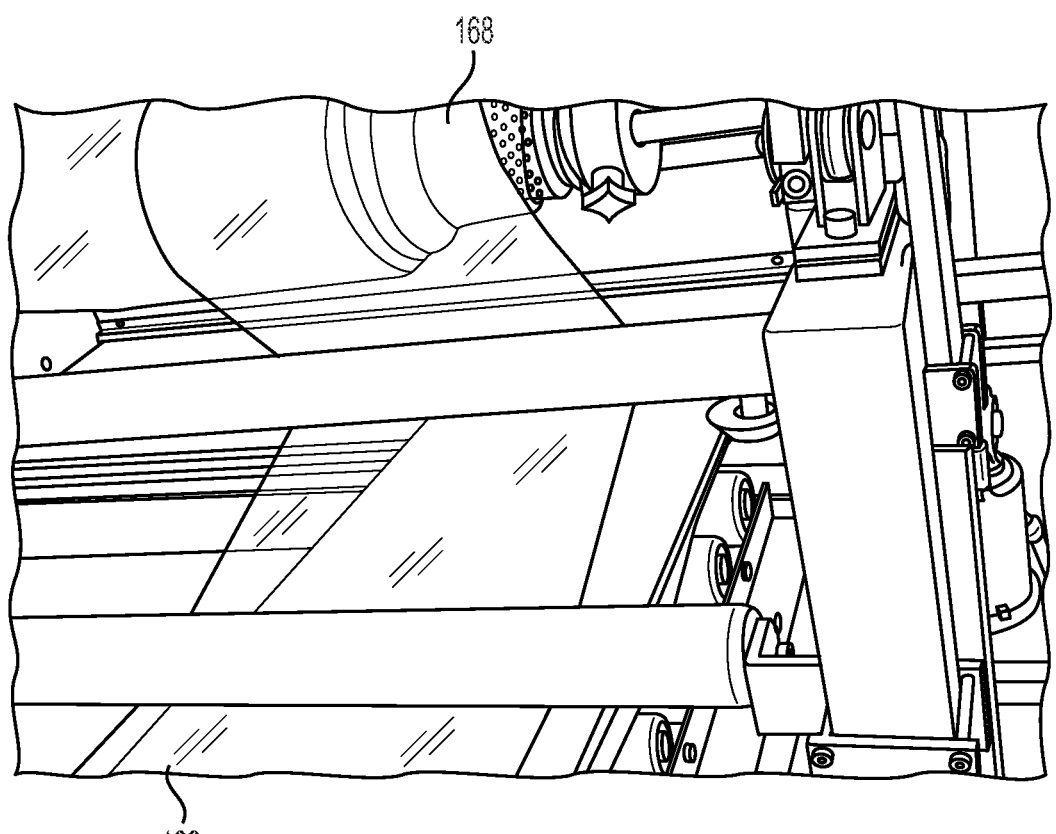
FIG. 14 illustrates the rewinding onto a roll of the second polymeric release film following curing of the admixture in the continuous belt mold.

As seen in FIG. 14, shortly after the panel 156 exits the continuously circulating mold 160, the first and second polymeric release films 122, 150 are retracted from the advancing panel 156. The first and second polymeric release films 122, 150 are preferably rewound onto two separate rolls 168 for either reuse, or disposal. This now leaves four layers including the cured thermoset resin sheet 130, first fiber sheet 138, uniformly distributed and cured admixture 146 and second fiber sheet 150 advancing through the remainder of the building product fabrication system.

As the now nearly fully fabricated building product advances further in the system it may be cut to a desired size to satisfy design specifications, such as a 7-inch or 8-inch-wide siding panel. The cutting to size is preferably performed by a knife blade or a saw blade that is well known in the art. Once the cutting to size is complete the finished building product may be painted and ultimately stacked for distribution.

In addition to the previously detailed in-line methodology for applying the thermoset resin 130, the same fabrication can be performed in a batch setting wherein the components are mixed, a coating is applied on the carrier film and wound in rolls and stored in a freezer. When ready to be cured, frozen rolls are unwound and cured by application of heat or ultra-violet light and cured.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

We claim:

1. A polymer composite building product, the building product comprising:
   a front face for facing outward from the building and a rear face for placement adjacent a surface of the building;
   a first fiber sheet comprising a total thickness T;

a thermoset polymer coating resin, the polymer coating resin infiltrating only about 2-3 mils ($T_R$) of the total thickness T of the first fiber sheet overlaid onto the polymer coating resin, wherein the building product front face is comprised of the first fiber sheet partially infiltrated with the polymer coating resin, the front face having a surface energy of greater than 38 dynes/cm;

a core comprised of a closed cell admixture composition with a filler loading at least 74 percent by total weight of the admixture, the admixture further comprising a first longitudinally extending surface and an opposed second longitudinally extending surface, the first longitudinally extending surface of the admixture infiltrating a remaining thickness ($T-T_R$) of the first fiber sheet not infiltrated with polymer coating resin; and a second fiber sheet comprising a second sheet areal weight in the range of 140-170 g/m$^2$ as well as an upper face and a lower face, the admixture penetrating and enmeshed through the entire thickness of the second fiber sheet, wherein the upper face of the second fiber sheet and the admixture enmeshed into the upper face of the second fiber sheet comprising the rear face of the building product.

2. The building product of claim 1, wherein the first fiber sheet is comprised of a fiberglass mat.

3. The building product of claim 2, wherein the fiberglass mat is comprised of randomly oriented fiberglass.

4. The building product of claim 1, wherein the second fiber sheet is comprised of a fiberglass mesh.

5. The building product of claim 4, wherein the fiberglass mesh is coated with the thermoset polymer coating resin.

6. The building product of claim 2, wherein the thickness T of the fiberglass mat is in the range of 20-30 mils.

7. The building product of claim 6, wherein the thickness T of the fiberglass mat is 25 mils.

8. The building product of claim 6, the percentage of infiltration of the thickness T of the first fiber sheet by the highly filled thermoset polymer coating resin is at least 10 percent.

9. A layered composite building product, the building product comprising:
    a front face and a rear face;
    a longitudinally extending highly filled thermoset polymer coating resin layer with a top surface and a bottom surface;
    a fiber mat with a top surface and a bottom surface, the fiber mat comprising a total thickness T, wherein the bottom surface of the fiber mat is embedded into the top surface of the thermoset polymer coating resin layer and the thermoset polymer coating resin infiltrates only a bottom portion thickness $T_R$ of the total thickness T of the first fiber mat, the bottom surface of the thermoset polymer coating resin forming the front face of the building product and the bottom surface of the thermoset polymer coating resin having a surface energy greater than 38 dynes/cm;
    a highly filled, closed cell admixture core, the admixture core comprising a longitudinally extending upper surface and a lower longitudinally extending surface, the lower longitudinally extending surface of the admixture infiltrating a top thickness $T_A$ of the fiber mat that is unoccupied by the thermoset polymer coating resin; and
    a longitudinally extending fiber mesh with a top surface and a bottom surface, a fiber mesh opening with an eye size of at least 4 mm$^2$ and an areal weight in the range of 140-170 g/m$^2$, the longitudinally extending upper surface of the admixture interlocked with the bottom surface of the longitudinally extending fiber mesh, the top surface of the longitudinally extending fiber mesh and the longitudinally extending upper surface of the admixture comprising the rear face of the building product.

10. The building product of claim 9, wherein the total thickness T of the fiber mat is in the range of 20-30 mils.

11. The building product of claim 10, wherein the bottom portion thickness $T_R$ of the fiber mat is in the range of 2-3 mils.

12. The building product of claim 9, wherein the admixture is comprised of a chain extender, a diisocyanate and a filler.

13. The building product of claim 12, wherein the chain extender is diethyl glycol (DEG) and about 50 percent of the filler particles comprise a diameter of less than 249 microns.

14. The building product of claim 9, wherein the thermoset polymer coating resin is comprised of at least one of epoxy, acrylate, urethane, vinyl ester, polyester, cyanate ester, benzocyclobutene, bismaleimide, ultra-violet light absorbers, hindered amine light stabilizer (HALS), antioxidants and colorants.

15. The building product of claim 14, wherein the thermoset polymer coating resin solution is further comprised of at least one curing agent.

16. The building product of claim 15, wherein the curing agent is comprised of at least one of an anhydride, an amine or a polyamide.

17. The building product of claim 9, wherein the thickness T of the fiber mat is in the range of 20-30 mils.

18. The building product of claim 9, wherein the fill rate of the building product is in the range of 1.18-2.23 kilograms per linear meter at a width in the range of 12.7-30.5 cm and thickness in the range of 7-10 mm.

19. The building product of claim 9, wherein the flexural strength of the building product is about 19.5 Mpa as determined by ASTM D790.

20. The building product of claim 9, wherein the fiber mat is comprised of randomly oriented glass fibers.

21. The building product of claim 9, wherein the fiber mesh is comprised of fiberglass.

22. The building product of claim 21, wherein the fiber mesh has an eye size of at least 2 mm by 2 mm.

23. The building product of claim 6, wherein the increase in weight of the building product due to water absorption is less than 2% as determined by ASTM D570 titled *Standard Test Method for Water Absorption of Plastics*.

24. A building product for application to the exterior of a building, the building product comprising:
    a front face for facing outward from the building and a rear face for placement adjacent a surface of the building;
    a longitudinally extending highly filled thermoset polymer coating resin layer with a top surface and a bottom surface;
    a fiber mat with a top surface and a bottom surface, the fiber mat comprising a thickness T, wherein the bottom surface of the fiber mat is pressed into the top surface of the thermoset polymer coating resin layer and the thermoset polymer coating resin infiltrates in the range of 2-3 mils of the total thickness T of the fiber mat, the bottom surface of the thermoset polymer coating resin forming the front face of the building product and the bottom surface of the thermoset polymer coating resin having a surface energy of greater than 38 dynes/cm;

a highly filled closed cell admixture core, the admixture core further comprising a longitudinally extending upper surface and a lower longitudinally extending surface, the lower longitudinally extending surface of the admixture infiltrating the remaining thickness T of the fiber mat that is unoccupied by the thermoset polymer coating resin; and a fiber mesh with a top surface and a bottom surface and mesh opening of at least 4 mm$^2$, the fiber mesh further comprising an areal weight in the range of 140-170 g/m$^2$, the longitudinally extending upper surface of the admixture interlocked with the fiber mesh, the top surface of the fiber mesh and the upper surface of the admixture comprising the rear face of the building product; wherein the increase in weight of the building product due to water absorption is less than about 2% as determined by ASTM D570 titled *Standard Test Method for Water Absorption of Plastics*.

25. The building product of claim 24, wherein the admixture is comprised of a chain extender, a diisocyanate and a filler.

26. The building product of claim 25, wherein the chain extender comprises diethylene glycol.

27. The building product of claim 24, wherein diethylene glycol comprises in the range of 5 to 20 percent by weight of the admixture.

28. The building product of claim 25, wherein the diisocyanate comprises in the range of 5 to 20 percent by weight of the admixture.

29. The building product of claim 25, wherein the filler comprises in the range of 50 to 85 percent by weight of the admixture.

30. The building product of claim 29, wherein the filler is sand.

31. A method for fabricating a polymeric composite building product according to claim 1 having a front surface and a rear surface; the method comprising:

feeding a first polymeric release film into a building component fabrication system;

depositing a thermoset polymer coating resin atop the first polymeric release film forming a continuous polymer sheet;

conveying the continuous polymer sheet disposed atop the first polymeric release film through a curing oven;

partially curing the continuous polymer sheet as the polymer sheet and the first polymeric release film advance through the curing oven;

laying a fiber sheet atop the advancing continuous polymer sheet;

depositing an admixture atop the advancing fiber sheet;

positioning a second fiber sheet atop the admixture;

positioning a second polymeric release film atop the second fiber sheet;

advancing the second polymeric release film, second fiber sheet, admixture, first fiber sheet, partially cured continuous polymer sheet and first polymeric release film disposed between top and bottom continuously circulating endless belts;

supporting the top and bottom continuously circulating endless belts with a plurality of upper and lower continuously circulating closely spaced plates;

curing the second fiber sheet, admixture, first fiber sheet and continuous polymer sheet, all disposed between the first and second polymeric release films, with heat from the plurality of continuously circulating closely spaced plates;

advancing the second fiber sheet, admixture, first fiber sheet and continuous polymer sheet, all disposed between the first and second polymeric release films, upon the bottom continuously circulating endless belt away from the plurality of upper and lower continuously circulating closely spaced plates; and withdrawing the first and second polymeric release films from the polymeric composite building product.

32. The method of claim 31, wherein the thermoset polymer coating resin solution is comprised of at least one of epoxy, acrylate, urethane, vinyl ester, polyester, cyanate ester, benzocyclobutene, and bismaleimide.

33. The method of claim 31, wherein the step of partially curing the continuous polymer coating resin comprises an oven curing temperature in the range of about 210° to 230° F.

34. The method of claim 31, wherein the step of conveying the polymer sheet through the curing oven comprises an oven cure time in the range of about 2 to 4 minutes.

35. The method of claim 31, wherein the fiber sheet is comprised of at least one of cellulose, acrylic, polyester, nylon, aramid, carbon fiber, glass mats and glass mesh.

36. The method of claim 31, wherein the fiber sheet is comprised of at least one of woven, non-woven, continuous and chopped fibers.

37. The method of claim 31, wherein the plurality of upper continuously circulating closely spaced plates emboss the rear surface of the building product.

38. The method of claim 31, wherein the step of curing the admixture comprises transferring heat from the upper and lower continuously circulating closely spaced plates to the admixture.

39. The method of claim 31, wherein the upper and lower continuously circulating closely spaced plates are heated to a temperature in the range of about 200° to 220° F.

40. A polymer composite building product according to claim 1, the polymer composite building product formed by a system, the system comprising:

an upper and a lower vertically opposed endless belt each comprising an inward facing surface and an outward facing surface, the endless belts for advancing the building component along the fabrication system;

a first polymeric release film feed system for positioning a first polymeric release film atop the advancing lower endless belt;

a thermoset polymer coating resin deposition system, wherein a thermoset polymer resin coating is deposited atop the first polymeric release film;

an oven for partially curing the advancing thermoset polymer coating resin;

a first fiber sheet dispensing system for dispensing a first fiber sheet atop the advancing cured polymer sheet and first polymeric release film;

an admixture deposition system for depositing an admixture atop the advancing fiber sheet, partially cured polymer sheet and first polymeric release film;

a second fiber sheet dispensing system for dispensing a second fiber sheet atop the advancing layered admixture, first fiber sheet, partially cured polymer coating resin and first polymeric release film;

a second polymeric release film feed system for dispensing a second polymeric release film atop the second fiber sheet, admixture, first fiber sheet, partially cured polymer coating resin and first polymeric release film;

an upper and a lower plurality of continuously circulating closely spaced plates disposed in contact respectively with the inward facing surfaces of the upper and a lower vertically opposed endless belts, wherein the closely spaced plates transfer heat through the upper and lower vertically opposed endless belts to the advancing second fiber sheet, admixture, first fiber sheet, partially cured polymer coating resin and first and second polymeric release films; and first and second polymeric release film retraction systems for retracting the first and second polymeric release films from the building component.

\* \* \* \* \*